UNITED STATES PATENT OFFICE.

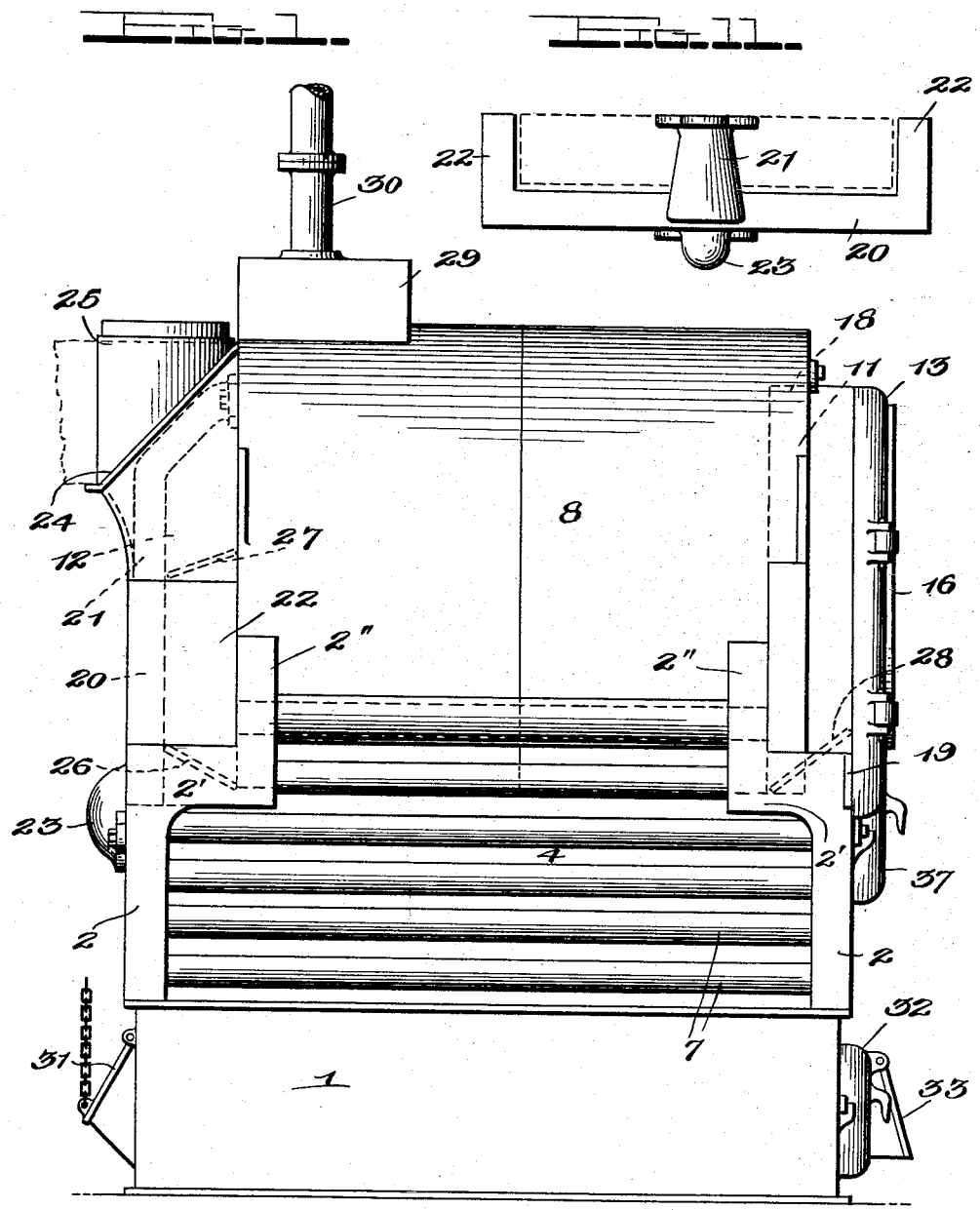

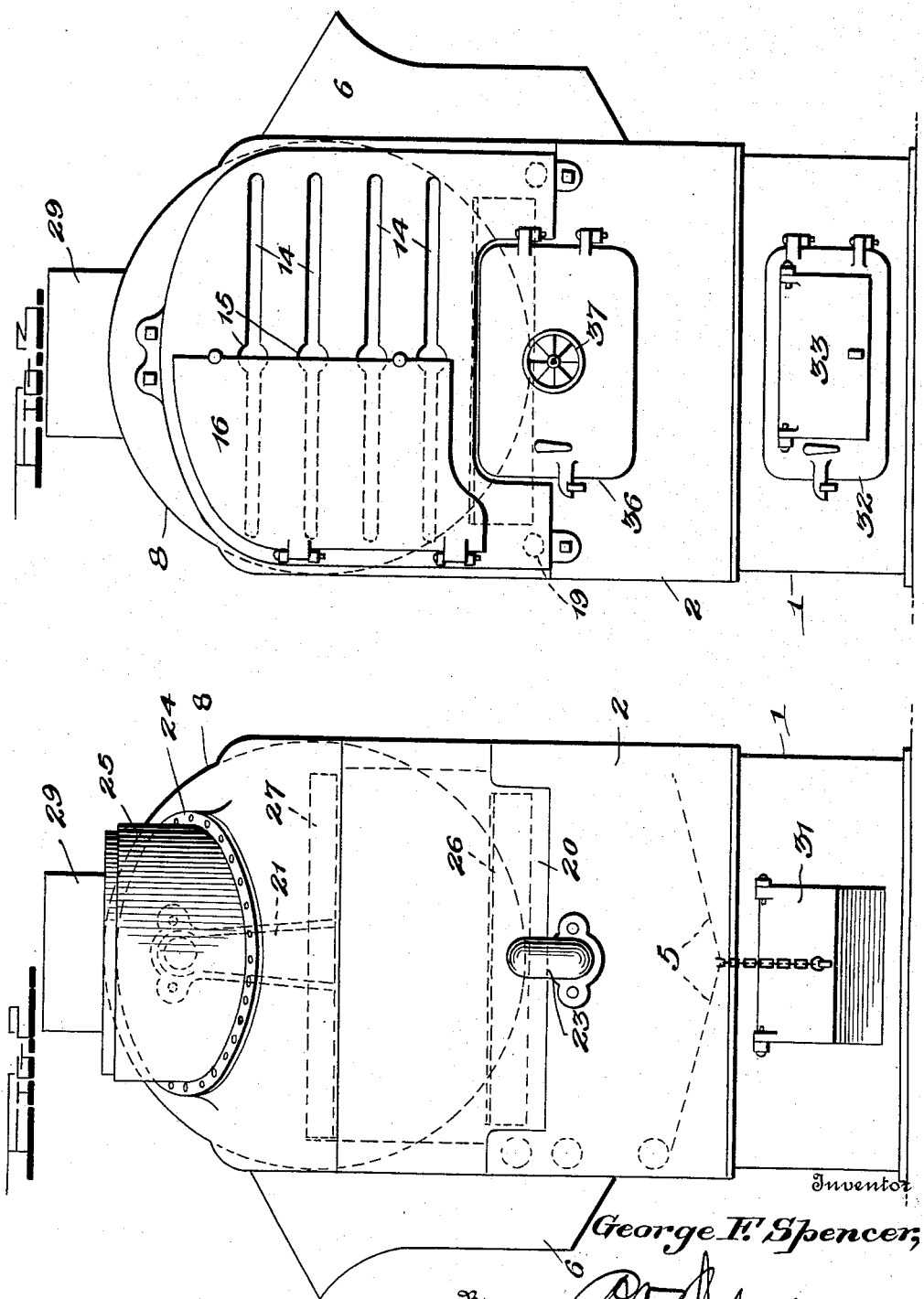

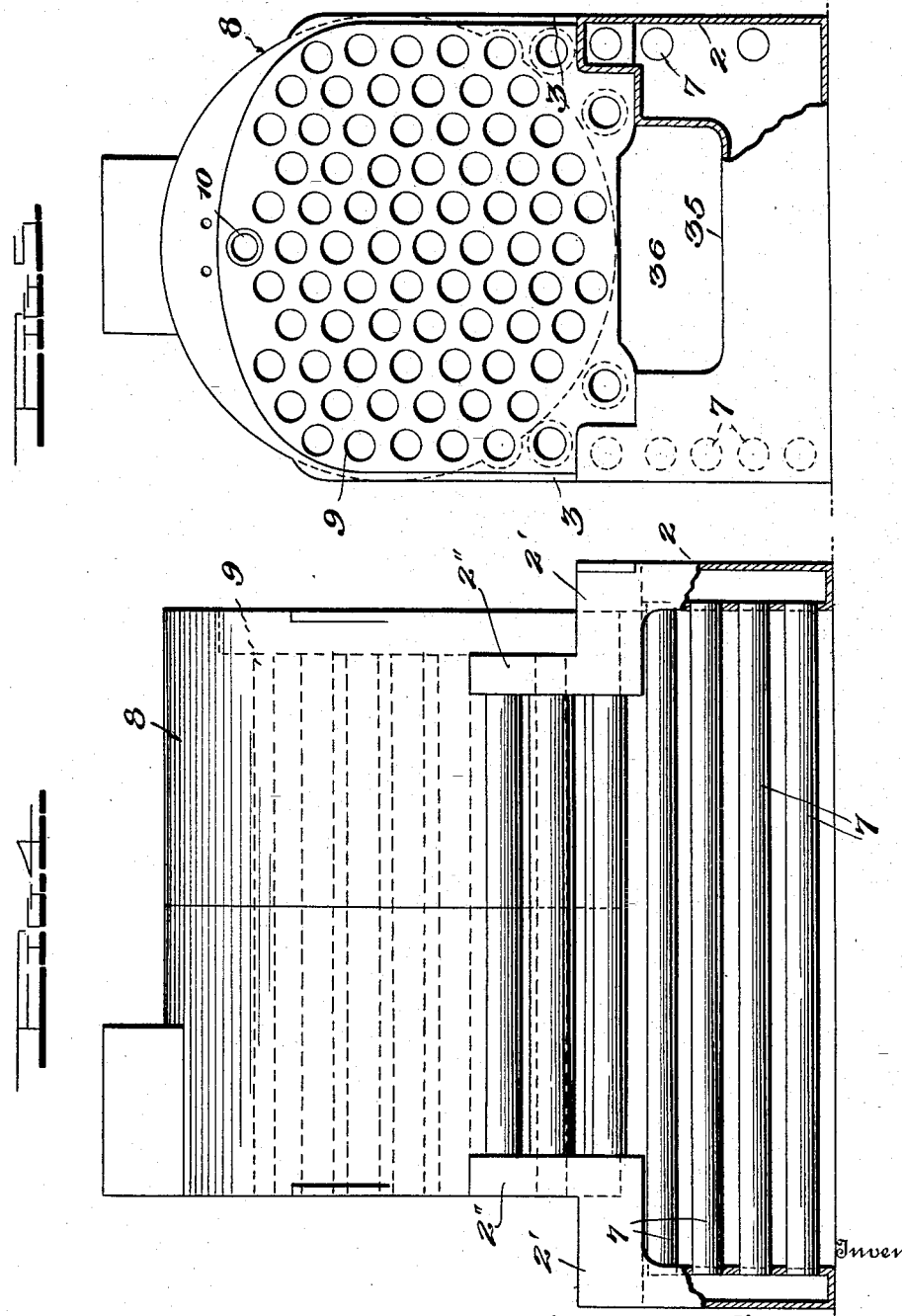

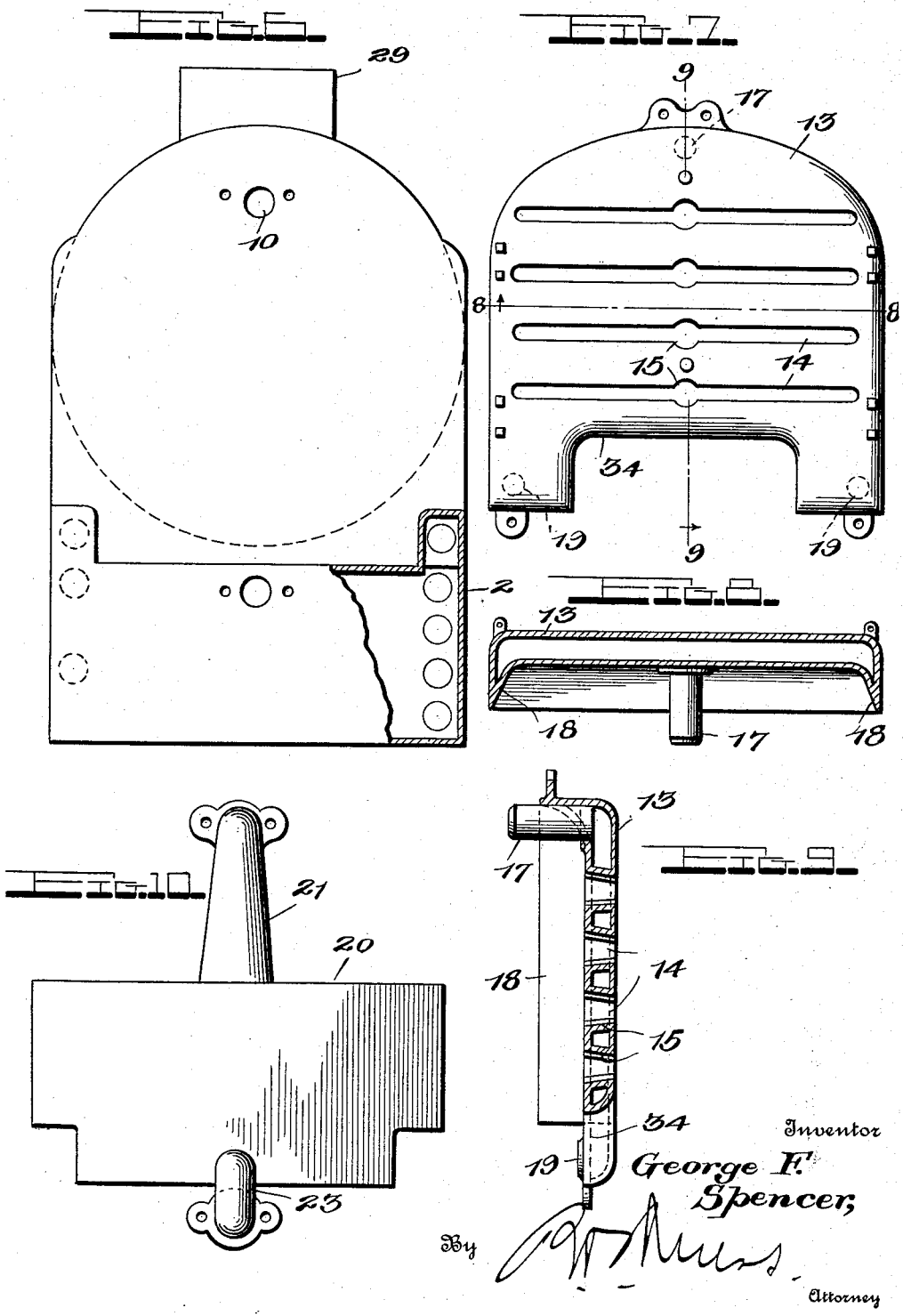

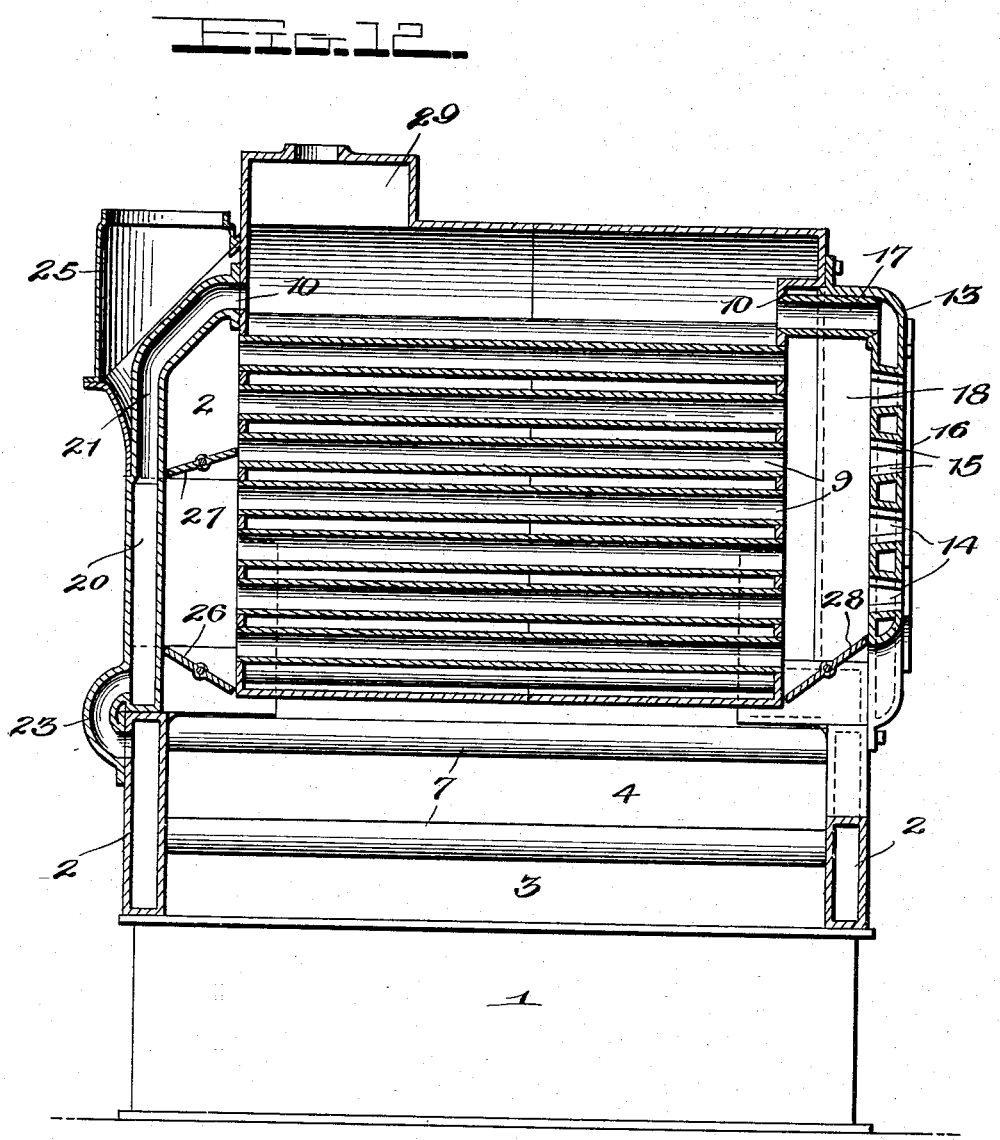

GEORGE FANTON SPENCER, OF THOMPSON, PENNSYLVANIA.

STEAM-BOILER.

1,177,366.  Specification of Letters Patent.  Patented Mar. 28, 1916.

Application filed April 29, 1915. Serial No. 24,764.

*To all whom it may concern:*

Be it known that I, GEORGE F. SPENCER, a citizen of the United States, residing at Thompson, in the county of Susquehanna and State of Pennsylvania, have invented new and useful Improvements in Steam-Boilers, of which the following is a specification.

The present invention is directed to improvements in steam boilers, and particularly to one designed for domestic heating purposes.

The invention has for its object to provide a boiler of this type with a flue at each end, and to provide each flue with dampers operable to change the direction of travel of the products of combustion, whereby the boiler will generate effectively under different draft conditions.

Another object of the invention is to provide a hot water jacket for each flue to aid in utilizing the products of combustion during the travel thereof through the flues, and previous to entry thereof into the boiler tubes whereby the heat of the products during the passage thereof through the flues is maintained instead of decreased, as is usual in boilers of all types.

A still further object of the invention is to provide one of the water jackets with slots to permit the insertion of a brush for cleaning the flues and fire tubes of the boiler.

A still further object of the invention is to provide a steam boiler so constructed that steam may be generated with a minimum amount of fuel.

In the drawings: Figure 1 is a side elevation of the boiler; Fig. 2 is a rear elevation; Fig. 3 is a front view; Fig. 4 is a side elevation of the boiler, the water jackets removed; Fig. 5 is a front elevation, the water jacket removed; Fig. 6 is a rear elevation, the water jacket being removed; Fig. 7 is a detail view of the front water jacket; Fig. 8 is a sectional view on the line 8—8 of Fig. 7; Fig. 9 is a similar view taken on the line 9—9 of Fig. 8; Fig. 10 is a detail view of the water jacket for the rear flue; Fig. 11 is a top plan view of the rear water jacket, removed, and showing in dotted lines the associated position of the rear flue dampers; and Fig. 12 is a longitudinal, vertical section of my improved steam boiler.

Referring to the drawing, 1 designates the ash pit upon the ends of which are supported hollow heads 2 which have suitably secured to their sides plates 3, each head having parallel and inward angular extensions consisting of the horizontal legs 2' and the vertical terminal legs 2''. The plates 3 form in conjunction with the heads 2 the fire box 4 in which are suitably supported inclined grate bars 5, indicated by dotted lines in Fig. 2, fuel being introduced to the fire box through hopper 6. The heads 2 are connected by water tubes 7, and since the same are located in the fire box 4 the water in the heads will be subjected to intense heat and will thus circulate through the heads and tubes.

The boiler 8 is supported above the fire box 4 in any suitable manner and has mounted therein in the usual manner fire tubes 9. At the front and rear of the boiler 8 are flues 11 and 12, respectively, the fire tubes 9 affording communication between said flues. Secured flush against the flue 11, and constituting a wall thereof with head 2, is a water jacket 13, which is provided with horizontal slots 14, said slots having central recesses 15 which form openings to permit the insertion of the head of a brush, the handle of which being freely movable the length of the slots whereby the tubes 9 and flues 11 and 12 may be conveniently cleaned or scraped. The slots 14 are normally closed with doors 16 which are hingedly connected to the jacket 13.

The inner wall of the jacket 13 is provided near its upper end with a nipple 17 which is adapted to engage in an opening 10 provided in the front wall of the boiler for establishing communication with the interior of the latter. It will be noted that the jacket 13 is provided with rearwardly extended side chambers 18 which extend upon opposite sides of the flue 11.

Formed near each corner of the inner wall of the jacket 13 is a hollow boss 19 which engages in suitable openings formed in the adjacent head 2.

A water jacket 20 provides an inclosing wall for the flue 12, as shown in dotted lines in Figs. 1 and 2, said jacket having a neck 21 extending across the flue and having its upper end connected to an opening 10 in the rear wall of the boiler. The jacket 20 is provided with forwardly projecting side clamps or arms 22 which extend upon opposite sides of the flue 12. The jacket 20 is provided with an elbow 23 which has its lower end fixed to the adjacent head 2, said elbow affording communication between the head and jacket.

The upper end of the flue 12 is beveled as at 24 and has fixed thereto in any suitable manner the beveled lower end of the smoke pipe 25. By beveling the flue and pipe it is obvious that the pipe may extend vertically, or if desired the same may be attached in a horizontal position, as shown in dotted lines in Fig. 1. Thus it will be seen that the smoke pipe 25 may be arranged for attachment to a horizontal or vertical outlet flue.

Mounted in the flue 12 is a pair of swinging dampers 26 and 27, while the flue 11 a single damper 28 is mounted. When it is desired to have a direct draft through the flue 12 the dampers 26 and 27 are moved to their open positions. When dampers 27 and 28 are open and damper 26 is closed the products of combustion will pass forwardly among the water tubes 7 passing up flue 11 and then rearwardly through all of the fire tubes 9 and into flue 12 and thence to chimney. To obtain still more fire travel the damper 26 is opened and dampers 27 and 28 are closed, thus causing the products of combustion to travel rearwardly among water tubes 7 into the lower portion of flue 12 and from thence forwardly in the fire tubes 9 located below the level of damper 27 into flue 11; said gases return rearwardly through fire tubes 9, located above level of damper 27, to the chimney. Thus it will be seen that the travel of the products of combustion may be so regulated as to suit different draft conditions. When the water in the tubes 7 and heads 2 is sufficiently heated it will circulate through said tubes and heads, jackets 13 and 20, thereby furnishing the jackets with hot water which will keep the flues 11 and 12 in a highly heated state so that when the products of combustion enter the flues it will retain its heat since the flues are heated previous to the entry of the products of combustion.

The boiler 8 is provided with a steam dome 29, and leading therefrom a pipe 30, which is connected to the general steam main of heating plant (not shown) which lead to the radiators.

One end of the ash pit 1 is provided with draft regulating damper 31, which may be operated in any suitable manner, while the other end thereof is provided with a cleanout door 32 having a draft damper 33 carried thereby. By providing each end of the ash pit with draft dampers the draft may be regulated at both ends of the ash pit.

The jacket 13 is provided with a cut away portion 34 which is arranged adjacent the cutaway portion 35 of the head adjacent thereto so as to provide a door opening, which is closed by a hinged door 37. The door opening 36 may be utilized in addition to the hoppers 6 for feeding fuel to the fire box or the same permits the entrance of a poker when it is desired to rake the fuel or remove clinkers.

Obviously, the jacket 13 may be done away with and simply a pair of heavy doors (not shown) substituted, the doors being adapted to resist heat sufficient not to warp out of shape. This may be desirable in cheaper constructions although not as practical.

What is claimed is:

1. A structure of the character described comprising a supporting base section having an ash pit provided with openings at its opposite ends, dampers for the openings to the ash pit, a superposed boiler section on the base section having a fire box and consisting of a head at each end, each head having spaced parallel horizontal portions extending inwardly and vertical terminal extensions thereon, water tubes arranged at the sides of the fire box and connecting the heads, a boiler supported on the head extensions and provided with a plurality of longitudinal fire tubes, said boiler also being formed in its opposite end walls with openings communicating with the boiler interior, water jackets secured to the heads and boiler and defining therewith flues at the opposite ends of the boiler, each water jacket having a tube extension fitting about the boiler openings in coincidence therewith for establishing communication between the jackets and boiler, and means establishing communication between one of said water jackets and its supporting head.

2. A structure of the character described comprising a supporting base section having an ash pit provided with openings at its opposite ends, dampers for the openings to the ash pit, a superposed boiler section on the base section having a fire box and consisting of a head at each end, each head having spaced parallel horizontal portions extending inwardly and vertical terminal extensions thereon, water tubes arranged at the sides of the fire box and connecting the heads, a boiler supported on the head extensions and provided with a plurality of longitudinal fire tubes, said boiler also being formed in its opposite end walls with openings communicating with the boiler interior, water jackets secured to the heads and boiler and defining therewith flues at the opposite ends of the boiler, each water jacket having a tube extension fitting about the boiler openings in coincidence therewith for establishing communication between the jackets and boiler, means establishing communication between one of said water jackets and its supporting head, a damper in one of the flues, and speed dampers in the other flue.

3. A structure of the character described comprising a fire box, a head arranged at each end thereof and provided with inwardly extending arms, a boiler supported by the arms of the heads over the fire box, a water jacket supported on the arms of each head and forming a flue with the adjacent end of the boiler, and means establishing communication between the water jackets and the boiler.

4. A structure of the character described comprising a fire box, a head arranged at each end thereof and provided with inwardly extending horizontal arms each of the latter having a vertical hollow post, a boiler supported on the posts and provided with fire tubes, a water jacket supported on the arms of each head and abutting the adjacent end wall of the boiler to define a flue therewith, and a damper in each flue journaled in and between the arms of the respective head.

5. A structure of the character described including a fire box, a boiler supported over the same and provided with fire tubes, a water jacket secured to one end of the boiler over the tubes and defining with the boiler, a flue, said jacket being provided with a plurality of slots through which access may be obtained to the tubes and flue, and closure means for the jacket slots.

6. A structure of the character described comprising a fire box, a head arranged at each end thereof and provided with inwardly extending, communicative connections between the water jackets and the boiler, a connection between one of the heads and the supported water jacket, and water tubes arranged at the sides of the firebox and connecting the heads, certain of said water tubes being supported by and connecting the opposing vertical posts of the heads.

7. A structure of the character described including a fire box, a superposed boiler, a head arranged at one end of the fire box and provided with a horizontal extension terminating in a vertical leg supporting the boiler, a water jacket seating on the head and having parallel arms resting on the head horizontal extensions to define a flue with the boiler, and a neck extension projecting upwardly from the water jacket and communicating with the boiler.

8. A structure of the character described including a fire box, a superposed boiler, a head arranged at one end of the fire box and provided with a horizontal extension terminating in a vertical leg supporting the boiler, a water jacket seating on the head and having parallel arms resting on the head horizontal extensions to define a flue with the boiler, a communicative connection between the water jacket and the supporting head, and a neck extension projecting upwardly from the water jacket and communicating with the boiler.

In testimony whereof I have hereunto set my hand in presence of two subscribing witnesses.

GEORGE FANTON SPENCER.

Witnesses:
W. F. SPENCER,
L. M. SPENCER.

Copies of this patent may be obtained for five cents each, by addressing the "Commissioner of Patents. Washington, D. C."